March 26, 1968  D. A. CECH  3,374,850
RESILIENTLY BIASED STEERING SYSTEM
Filed Aug. 2, 1966
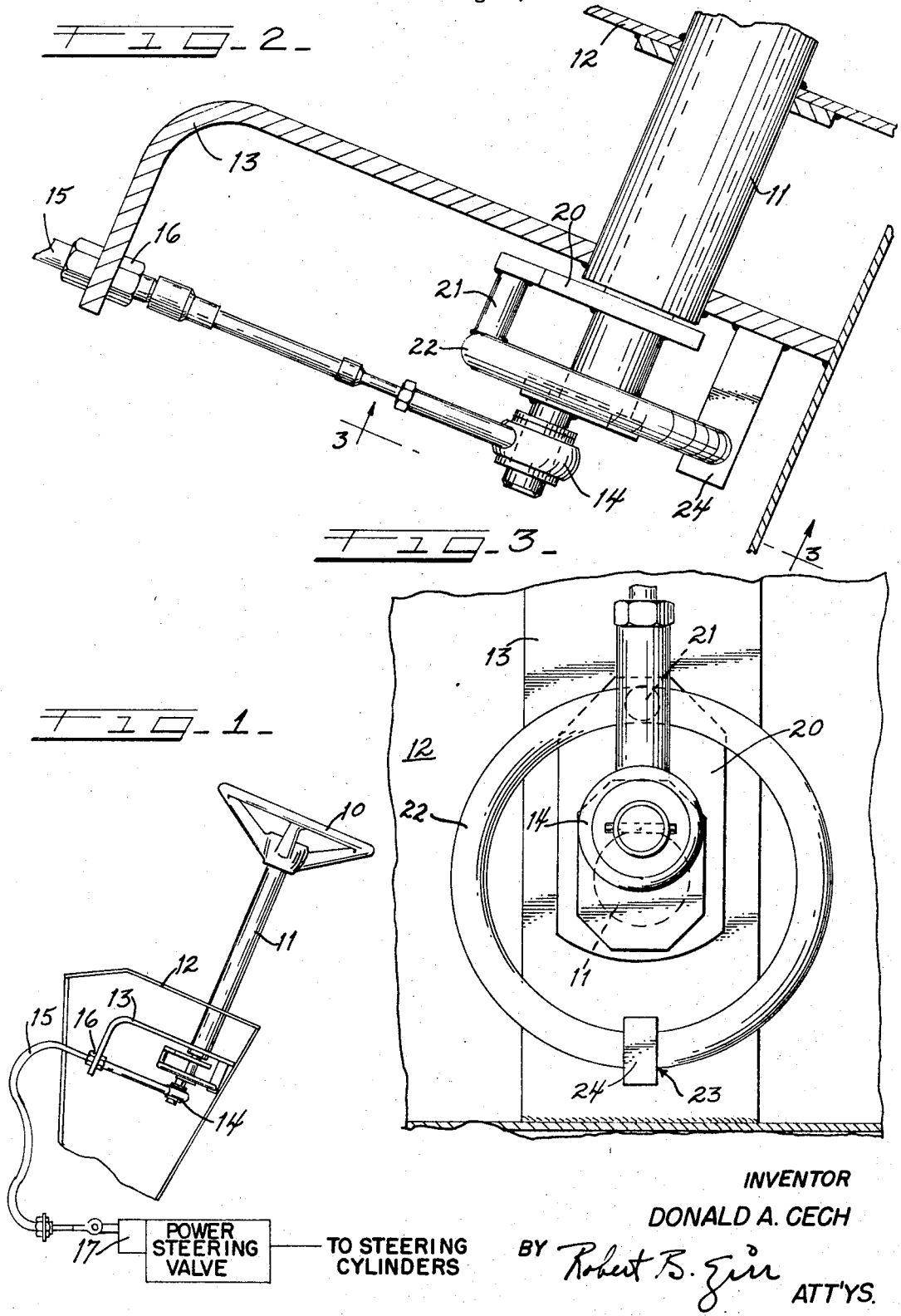
INVENTOR
DONALD A. CECH
BY Robert B. Gill
ATT'YS.

United States Patent Office 3,374,850
Patented Mar. 26, 1968

3,374,850
RESILIENTLY BIASED STEERING SYSTEM
Donald A. Cech, Cicero, Ill., assignor to International Harvester Company, Chicago, Ill., a corporation of Delaware
Filed Aug. 2, 1966, Ser. No. 569,747
1 Claim. (Cl. 180—79.2)

ABSTRACT OF THE DISCLOSURE

A device for use in a steering system for holding a rotatable steering wheel in a centered position, the device having a predetermined resilient bias force acting on a rotatable steering column which bias can be overcome by a sufficient steering turning force to then provide steering action.

This invention relates to a vehicle steering system, and more particularly relates to a device for physically biasing the steering column in a neutral center position, while still providing power steering once the steering wheel is turned from its center position.

With heavy-duty equipment, much of the usage is in off-the-road applications and generally on uneven and bumpy surfaces. In this type of driving it has been found that the operator of the vehicle utilizes the steering wheel for support as well as for steering. Thus, as the operator's body is being jolted and he is attempting to support himself by holding on to the steering wheel, there is a problem in maintaining a straight line of vehicle travel. By providing a steering system which tends to retain a centered position of the steering wheel this steering problem can be overcome and straight line steering can be maintained.

It is therefore an object of the present invention to provide biasing means connected to the steering mechanism which permits the steering wheel and steering column to be held for support without causing steering deviations of the vehicle.

A further object of the present invention is to provide means for operating a power steering system wherein a manually activated steering wheel operates a hydraulic steering system through a push-pull cable arrangement, after sufficient force is applied to overcome the predetermined bias loading of the steering column.

Other objects and advantages will become readily apparent from the following detailed description taken in connection with the accompanying drawings, in which:

FIGURE 1 represents an over-all perspective of the invention;

FIGURE 2 represents an enlarged cross-sectional view of details taken from FIGURE 1, and FIGURE 3 represents a bottom view taken in the direction of the arrows along the line 3—3 in FIGURE 2.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claim.

Referring now to the drawings, FIGURE 1 illustrates a steering wheel 10 connected in a conventional manner to a steering column 11. The steering column 11 extends through a support 12 which also holds a support bracket 13. At the bottom of steering column 11 there is a camming device 14 connected to a cable apparatus 15 as is well known in the art. This cable 15 passes through support bracket 13 as at 16 and is connected to a hydraulic valve 17. The hydraulic valve 17 controls the steering cylinder or cylinders as is well known. Thus, as the steering wheel 10 is turned the power steering valve 17 is activated and steering will occur. All the foregoing is conventional in hydraulic power steering and the above description is deemed sufficient for an understanding thereof.

The novel portion of this invention will now be described. Referring now to FIGURES 2 and 3 it will be noted that a holding bracket 20 is affixed to steering column 11. This holding bracket 20 has a downwardly depending flange portion 21 thereon. Attached to flange 21 is a resilient means 22, shown herein as an annular spring having a cut-out portion 23. Positioned in the cut-out portion 23 of spring 22 is a holder or stop 24 which is affixed to support bracket 13 by welding or similar means. Thus it will be seen that spring 22 will tend to prohibit turning of steering wheel 10 until sufficient force is applied to the wheel 10 to overcome the spring 22, thereafter permitting movement of cable 15 to actuate the hydraulic valve 17. The force exerted against the turning of wheel 10 is predetermined by the compression value of spring 22 and may be increased or decreased as desired by utilizing various numbers of springs having varying compression values.

It will further be noted that this novel arrangement will also always return the steering to a fixed neutral position when the steering wheel 10 is released from its active steering position. Thus a device is shown which satisfies the objects set forth hereinabove, and which will provide a dependable, relatively maintenance free center biased steering system.

I claim:
1. A device for maintaining straight line steering comprising: manual steering means for receiving steering information; support means; a rotatable steering column connected to said steering means and extending through said support means; crank means affixed to said steering column; power steering means for physically performing the steering function; mechanical means connecting the crank means and the power steering means for transmitting said steering information from the steering means to the power steering means; stop means affixed to the support means at a position radially spaced from the steering column; and an annular resilient member positioned to encircle the steering column in a plane normal to the axis thereof, the resilient member having a cut-out portion; the stop means being positioned within the cut-out portion in contact at either side of the stop means with the resilient member; and means to affix the resilient member to the steering column to bias said steering column in a fixed position thereby maintaining straight line steering while permitting such steering column upon the application of a sufficient manual turning force on said steering means to rotate thereby operating said power steering means to perform the steering function.

References Cited

UNITED STATES PATENTS

| | | | |
|---|---|---|---|
| 2,935,276 | 5/1960 | Westbury et al. | 244—83.7 |
| 3,159,230 | 12/1964 | Gordon | 180—79.2 |
| 1,320,557 | 11/1919 | Koepke | 280—94 |
| 1,610,057 | 12/1926 | Humphery | 280—94 |

LEO FRIAGLIA, *Primary Examiner.*

BENJAMIN HERSH, *Examiner.*

J. H. BRANNEN, J. A. PEKAR, *Assistant Examiners.*